(12) United States Patent
Rao et al.

(10) Patent No.: US 7,475,296 B2
(45) Date of Patent: Jan. 6, 2009

(54) SERVICEABILITY AND TEST INFRASTRUCTURE FOR DISTRIBUTED SYSTEMS

(75) Inventors: Sudhir G. Rao, Portalnd, OR (US);
Pradeep Satyanarayana, Beaverton, OR (US)

(73) Assignee: International Business Machines Corporation, Armonk, NY (US)

(*) Notice: Subject to any disclaimer, the term of this patent is extended or adjusted under 35 U.S.C. 154(b) by 345 days.

(21) Appl. No.: 10/849,658

(22) Filed: May 20, 2004

(65) Prior Publication Data

US 2005/0273675 A1    Dec. 8, 2005

(51) Int. Cl.
    *G01R 31/28*    (2006.01)
(52) U.S. Cl. .................. 714/100; 714/39; 714/49
(58) Field of Classification Search .............. 714/100, 714/39, 49; 707/49
    See application file for complete search history.

(56) References Cited

U.S. PATENT DOCUMENTS

| | | | |
|---|---|---|---|
| 3,585,599 A | 6/1971 | Hitt et al. | |
| 6,332,200 B1 | 12/2001 | Meth et al. | |
| 6,662,310 B2 | 12/2003 | Lopez et al. | |
| 7,069,317 B1* | 6/2006 | Colrain et al. | 709/224 |
| 7,080,141 B1* | 7/2006 | Baekelmans et al. | 709/224 |
| 7,117,396 B2* | 10/2006 | Komarla et al. | 714/45 |
| 7,124,328 B2* | 10/2006 | Bowers et al. | 714/39 |
| 7,213,246 B1* | 5/2007 | van Rietschote et al. | 718/1 |
| 2002/0174384 A1* | 11/2002 | Graichen et al. | 714/37 |
| 2002/0188426 A1 | 12/2002 | Datta et al. | |
| 2003/0182317 A1 | 9/2003 | Kahn et al. | |
| 2003/0195903 A1 | 10/2003 | Manley et al. | |
| 2003/0225816 A1 | 12/2003 | Morrow et al. | |
| 2003/0236880 A1* | 12/2003 | Srivastava et al. | 709/224 |
| 2004/0010778 A1 | 1/2004 | Kaler et al. | |
| 2004/0030951 A1 | 2/2004 | Armangau | |
| 2005/0021569 A1* | 1/2005 | Lanzatella et al. | 707/200 |
| 2005/0210331 A1* | 9/2005 | Connelly et al. | 714/26 |
| 2005/0251785 A1* | 11/2005 | Vertes et al. | 717/105 |
| 2006/0129610 A1* | 6/2006 | Agarwal et al. | 707/202 |

\* cited by examiner

*Primary Examiner*—Christian P. Chace
*Assistant Examiner*—Raheem Hoffler
(74) *Attorney, Agent, or Firm*—Lieberman & Brandsdorfer, LLC

(57) ABSTRACT

A method and system for capturing a state of a distributed computer system is provided. The state is captured in response to an error or event message received by one of the clients and/or server nodes of the system. In response to receipt of the error or event message, the recipient initiates transmission of a special protocol message of affected members of the system. Upon receipt of the message, all recipients will conduct a freeze of their respective operating system image. Depending upon the characteristics of the error or event, the message may be transmitted to a selection of members of the system, or the entire system.

19 Claims, 3 Drawing Sheets

SERVICEABILITY AND TEST INFRASTRUCTURE FOR DISTRIBUTED SYSTEMS

BACKGROUND OF THE INVENTION

1. Technical Field

This invention relates to a method and system for servicing a computer system. More specifically, the invention relates to a capture of a state of a node in a distributed computer system in response to an event.

2. Description of the Prior Art

In a distributed computer system with shared persistent storage, one or more server nodes are in communication with one or more client nodes. FIG. 1 is a block diagram (10) illustrating one example of a distributed computer system. As shown, there are two server nodes (12) and (14), three client nodes (16), (18), and (20), and a storage area network (5) that includes one or more storage devices (not shown). Each of the client nodes (16), (18), and (20) may access an object or multiple objects stored on the file data space (27) of the storage area network (5), but may not access the metadata space (25). In opening the contents of an existing file object on the storage media of the storage device in the storage area network (5), a client contacts the server node to obtain metadata and locks. Metadata supplies the client with information about a file, such as its attributes and location on the storage devices. Locks supply the client with privileges it needs to open a file and read or write data. The server node performs a look-up of metadata information for the requested file within the metadata space (25) of the storage area network (5). The server nodes (12) or (14) communicate granted lock information and file metadata to the requesting client node, including the location of the data blocks making up the file. Once the client node holds a distributed lock and knows the data block location(s), the client can access the data for the file directly from a shared storage device attached to the storage area network.

Distributed computer systems have complex messaging protocols that operate among server nodes and clients. Messages may be passed among the server nodes and clients for various purposes, including servicing techniques. When an error occurs in the operation of one of the server nodes and/or clients, isolating the problem is critical to identifying a solution to mitigate and/or prevent the problem from re-occurring. Traditional Unix systems have the ability to capture a logical image of the system for analysis and writing a file associated with the logical image to disk prior to a shut-down of the system. However, such a solution is limited to a single node, and is not extendible to a distributed computer system. Extending the solution of a single node system to a distributed system becomes complex in consideration of messaging techniques among the server nodes and/or clients.

One prior art solution, U.S. Patent Publication 2004/0010778 to Kaler et al., embeds debug controls along with distributed application data in messages that are utilized by distributed applications during normal operations. Kaler et al. uses in-band message protocols for communication in the distributed computer system, wherein message operations are transported across the system via routers and/or gateways. However, limitations associated with embedding debug controls in in-band message protocols include the inability to enable the client and/or server nodes in the system from differentiating the urgency of the message based upon the channel of communication. When a state of the system needs to be captured, urgency in communication among the server nodes and/or clients in the distributed system is critical.

Therefore, there is a need for a new dedicated messaging technique in a distributed computer system that enables efficient communication among the server nodes and/or clients. In addition, there is a need for creating a logical image of a distributed computer system at the time an error occurs so that the image can be studied to determine the cause for the occurrence of the error.

SUMMARY OF THE INVENTION

This invention comprises a method and system for capturing a state of operation of a computer system.

In one aspect of the invention, a method is provided for servicing a computer system. A dedicated message is delivered to all nodes in the system that are affected by an event. Upon receipt of the message, a capture of the state of at least one of the nodes is initiated.

In another aspect of the invention a computer system is provided having a messenger adapted to deliver a dedicated message to all nodes in the system that are affected by an event. A capture of a state of at least one of the nodes is initiated upon receipt of the message.

In yet another aspect of the invention, an article is provided with a computer-readable signal-bearing medium. Means in the medium are provided for delivering a dedicated message to all nodes affected by an event. In addition, means in the medium are provided for initiating a capture of a state of at least one of the nodes upon receipt of the message.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

In a distributed computer system, a messaging technique having a special protocol is employed to enable efficient communication of urgent messages and to initiate a capture of a state of a distributed computer system, or elements thereof. The messaging technique uses a dedicated message that enables a unidirectional communication since a recipient of the message does not have the ability to respond to the sender. Upon receipt of the message by a client node, the recipient will initiate a freeze of their state. However, when a server node receives the message it broadcasts a freeze command to other server nodes and/or clients in the system using the special protocol messaging technique prior to initiating a freeze of its state. The message technique in conjunction with the terms of the message creates a partial or global freeze of the distributed computer system.

Technical Details

Figure 1:
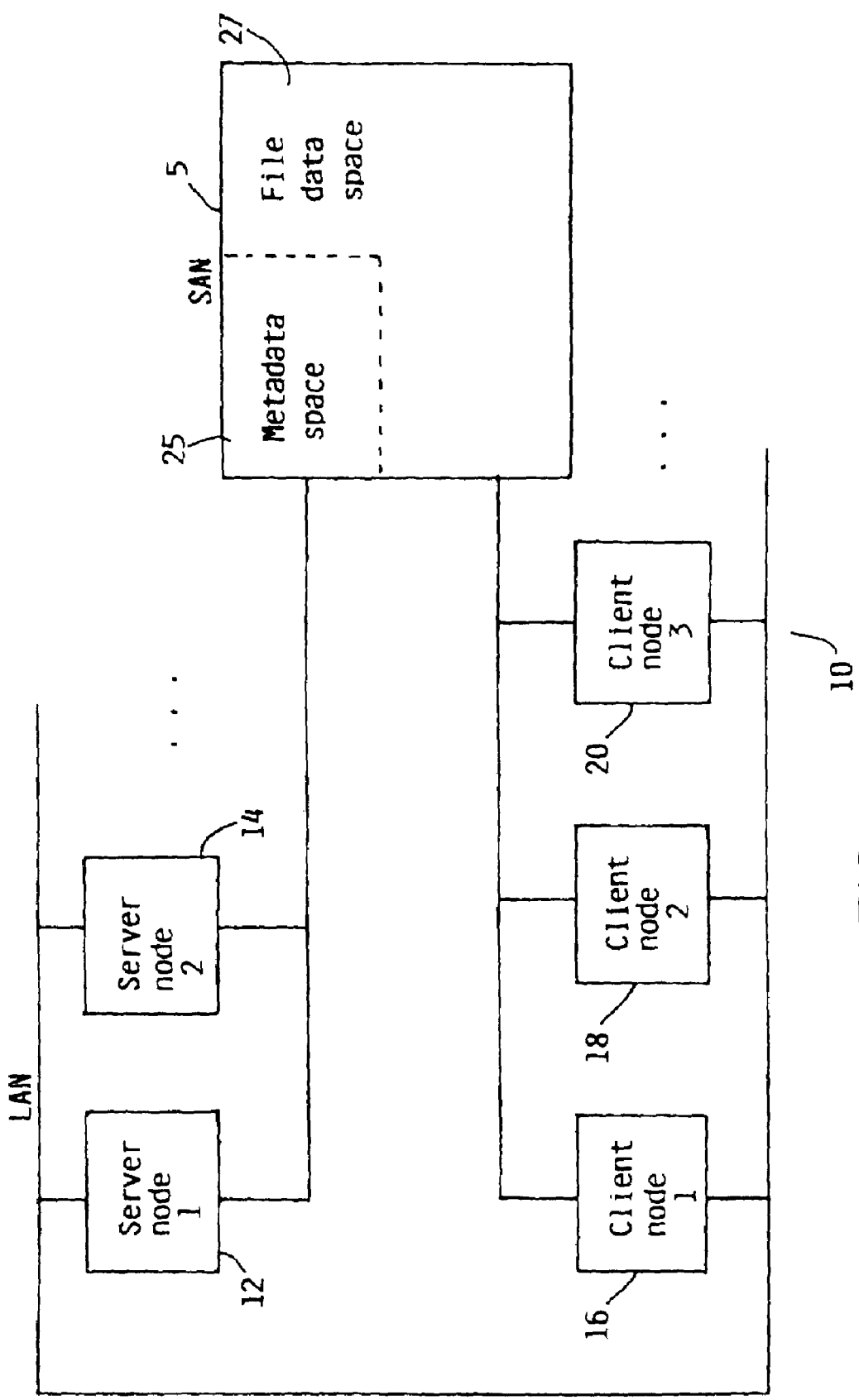
FIG. 1 is a block diagram of a prior art distributed computer system.

A distributed computer system, as shown in FIG. 1, consists of one or more clients (16) (18) (20), and one or more server nodes (12) (14), and a storage are network (5) that includes one or more storage devices (not shown). The server nodes (12) (14) may operate in a cluster, wherein one or more nodes coordinate access to the storage area network (5). One server node may serve as a cluster leader for one or more functions in the system. The cluster leader owns certain tasks for which member nodes in the cluster require communication with the leader to support a desired service. One or more server nodes in the cluster may serve as a coordinator for one or more functions in a particular subsystem. The coordinator may be assigned responsibilities concerning a particular subsystem. For example, a coordinator may be assigned to manage a portion of the file data space (27) available in the system. Accordingly, there may be one cluster leader per cluster of nodes and multiple coordinators with each coordinator being assigned different responsibilities.

A state of operation of an element in a distributed computer system is a discrete characteristic of the operation of the system. The state of a distributed computer system at any point is characterized by at least the following states: an individual client state, a channel state, and a server state. The individual client state is a composite state that can be separated into different states. Clients can transition from one state to an alternative state. Examples of a client state transition include: receipt of a message from one of the server nodes, receipt of an I/O request, and a local event driven state change. The channel state is a state of the communication medium between the client(s) and the server node(s). The server state is a composite state consisting of the coordinator server state(s) and the non-coordinator server state(s). When either one of the coordinators or non-coordinators changes to a different state, the server state transitions to a new state. Examples of server state transitions include: receipt of a message from at least one of the clients in the system, receipt of a message from another server node in the system, a local event driven state change, and a coordinator driven event Any one of these events can cause the transition of a coordinator or non-coordinator to a new state, which in effect causes the entire system to enter the new state. When a client and/or server experiences a freeze, the ability to transition to another state is not supported. A freeze can be in the form of a crash, which would require a reboot to continue operations, or it can be a hanging of the threads, which supports continued operation of the threads but does not allow the threads to send or receive messages. Accordingly, each of the clients and servers in the distributed computing system may be characterized by its state of operation.

At such time as the system experiences an error in at least a client, server, and channel state, the system may transition into an incoherent state of operation. To determine the cause of the error that resulted in the incoherent state, an image of the computer system must be captured and reviewed. A system freeze is a mechanism that captures the system state at a point in time. In a distributed computer system, a global system freeze captures the state of all clients and server node at a point in time. Examples of events that may dictate an entire system freeze include detection of data corruption, and locking issues. Alternatively, the freeze can be a partial freeze capturing specific portions of the system. Examples of events that may dictate a partial freeze include types of internal errors, an operator generated command, and predefined events. Accordingly, the extent of the freeze may be partial or global depending on the characteristics of the event or error that initiated the freeze.

In order to initiate a partial or global system freeze, a communication protocol among the server nodes and between the server nodes and/or clients must be established. The communication protocol must force each of the members of the system to freeze an image of their operating system at a given point in time. Coordinator and non-coordinator server nodes in the system generally communicate using a cluster protocol that enables the server nodes to communicate internally. However, they may also communicate through storage media in the storage area network, also known as disk based messaging. Communication through the storage media requires that a value be written to one of the storage medias. For example, this value can be read by an assigned thread that operates on each of the server nodes. The value written to the storage media functions as a message. In the case of a system freeze, the value written to the storage media may indicate to each of the server nodes that a system freeze is required and identify the server nodes affected by the freeze.

Figure 2:
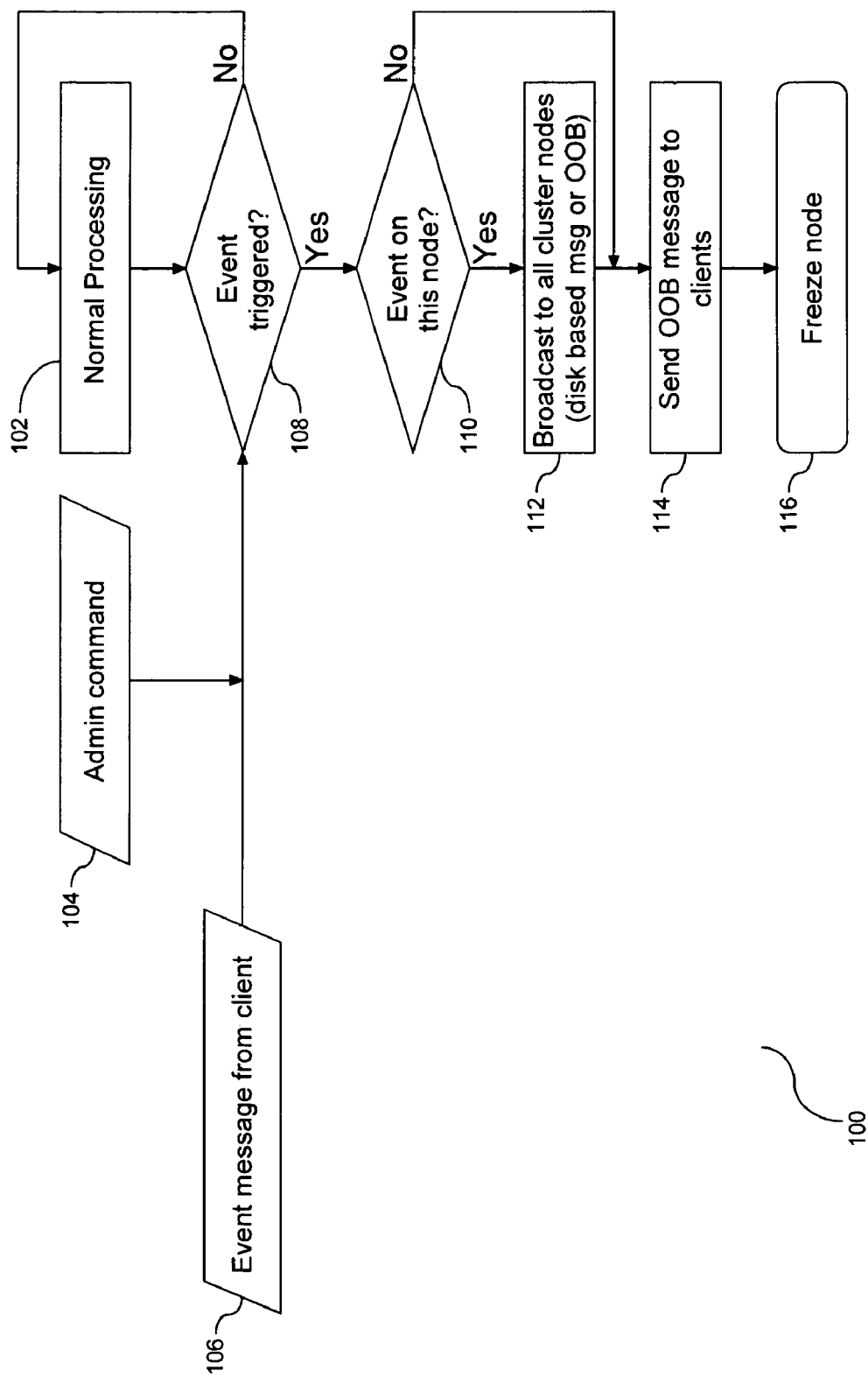
FIG. 2 is flow chart illustrating a server processing and responding to an event according to the preferred embodiment of this invention, and is suggested for printing on the first page of the issued patent.

FIG. 2 is a flow chart (100) illustrating the process of initiating a system freeze when the event that initiates the freeze instruction emanates from at least one fo the server nodes. At some point prior to the occurrence of an error or a message requesting a system freeze, members of the distributed computer system execute processes and operate under standard conditions (102). Following the issuance of a command by a coordinator (104) or receipt of an event message by one or more of the server nodes from a client in the system (106), a test is conducted to determine if the command and/or event warrants a freeze of the system (108). A negative response to the test at step (108), will allow the system to continue operating under standard conditions and return to step (102). However, a positive response to the test at step (108) is an indication that the command and/or event necessitates a freeze of the system. A subsequent test is conducted to determine if the command and/or event originated on this server node processing the command and/or event (1110). if the response to the test at step (110) is positive, the server node processing the command and/or event broadcasts a message to all server nodes that are members of a cluster of the server node processing the command and/or event requiring a system freeze after the notified node communicates a freeze command to all affected client nodes (112). In one embodiment, the dedicated message among server nodes may be in the form of disk based messaging through storage media or an out-of-band communication. Following the broadcast of the message at step (112) or following a negative response to the test at step (110), a message is sent to all clients in the system in communication with at least one of the cluster members requiring a freeze of the client state (114). In one embodiment, the dedicated message sent to the client nodes by the server node(s) is an out-of-band message with a freeze command embedded thereon. One out-of-band message is transmitted to all affected client nodes. Upon receipt of the message, each recipient client and/or server node in the distributed computer system initiates a freeze of their state (116). In one manifestation, a partial freeze occurs when the message is transmitted to a selection of the client nodes that is less than all of the client nodes in the system, or if a client node in receipt of the message ignores the associated freeze command. Accordingly, a server node that receives a command or experiences an event that warrants a freeze may initiate a series of special protocol communications to each of the server nodes and/or clients in the distributed computer system that need to be frozen.

Figure 3:
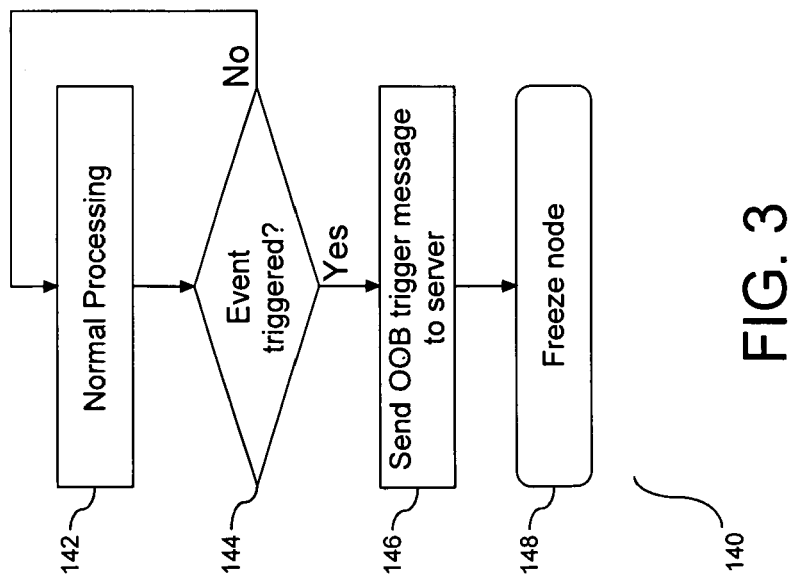
FIG. 3 is a flow chart illustrating a client processing a client generated event.

Similarly a client processing an instruction or a series of instructions may experience an event that requires a freeze of one or more clients and/or server nodes in the distributed computer system. The client may generate an event that initiates communication prior to the freeze, or the client may process a server or coordinator generated event that initiates communication prior to the freeze. FIG. 3 is a flow chart (140) illustrating a client initiating communication for a system freeze based upon a client generated event. At some point prior to the occurrence of an event that initiates communication for a system freeze, both the clients and server nodes of the distributed computer system are shown executing processes and operating under standard conditions (142). Following a client generated event, a test is conducted to determine if this event warrants a freeze of the system (144). A negative response to the test at step (144), will allow the client to continue operating under normal operation conditions and return to step (142). However, a positive response to the test at step (144) will result in sending a message to at least one of the server nodes (146). The message is a dedicated message with a freeze command embedded therein. Since the recipient of the message will initiate a freeze of their state and will not have the ability to communicate a response message to the sender, the message is unidirectional. In one embodiment, the dedicated message may be an in-band message or an out-of-band message. Upon receipt of the message, the server node will recognize the freeze terms associated with the message and forward freeze instructions to other server nodes in the system, if warranted. Once the message has been communicated from the client to at least one of the server nodes, the client that generated the event experiences a freeze of their state (148).

Figure 4:
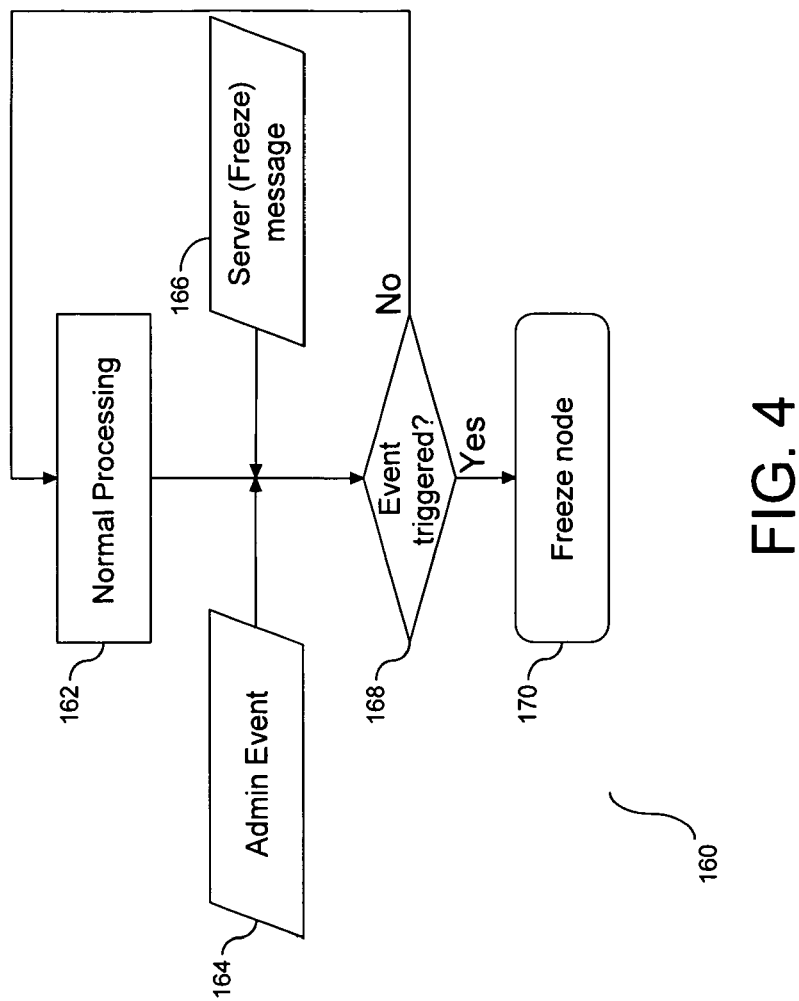
FIG. 4 is a flow chart illustrating a client processing a server generated event.

Similarly, FIG. 4 is a flow chart (160) illustrating a client processing instructions for a server node or coordinator generated event. At some point prior to the occurrence of an event that initiates communication for a system freeze, both the clients and server nodes of the distributed computer system are shown executing processes and operating under standard conditions (162). Following the issuance of a command by a coordinator (164) and/or receipt of a freeze message from one or more of the server nodes (166), a test is conducted to determine if the command and/or message has initiated an event that warrants a freeze of the client (168). A negative response to the test at step (168), will allow the client to continue operating under standard conditions and return to step (162). However, a positive response to the test at step (168) is an indication that the command and/or server originated message necessitates a freeze of the client (170). Accordingly, a client may either generate an event that requires a freeze of the client, other clients, and/or one or more server nodes in the system, or the client may process a server node generated event that requires a freeze of the client, another client, and/or one or more server nodes in the system.

Whether the event originates on the client or one of the server node, the event will dictate the extent of the freeze. The purpose of initiating a complete or partial freeze of the system is to determine the source of the problem that triggered the event and to correct the problem. As shown in the illustrations herein, the freeze initiated event may be caused by standard operations or by a message or command received by the client and/or server wherein the message or command may have an error injected in the associated computer readable medium. The injection of an error can be of assistance for logging and tracing state transitions across the system. Following a freeze, an analysis of the system state can begin. The analysis may include reconstruction of the events and/or state transitions that initiated the freeze. In addition, another form of analysis may include pausing all of the relevant threads and processes for a defined duration and analyzing the system with the paused threads. Regardless of the specific type of analysis conducted, the purpose of the freeze in combination with analysis tools is to reconstruct events and associated state transitions that necessitated a partial or complete freeze of the distributed system.

Advantages Over the Prior Art

The process of freezing the distributed computer system enables a partial or complete freeze of the system at a point in time. The communications that instruct the associated client and/or server node to freeze are preferably dedicated messages sent using an out-of-band messaging technique, although they may be sent using an in-band messaging technique. The communication of a freeze command between a client and a server node using the out-of-band technique together with a freeze command embedded therein is unidirectional in that upon receipt the state of the recipient is frozen. The messaging technique captures a state of the associated client and/or server node at the closest possible time to the occurrence of an event. Once a client or server is frozen in a state, they cannot transmit messages, as that would be entering another state. In addition to the communication format, a coordinator may embed an event into the system, as shown at steps (104) (164). The ability to embed an event provides fine grain control of the system by the coordinator since it enables cluster administered techniques to initiate a freeze of the system. Accordingly, the coordinator can place error injection instructions into the event to initiate a partial or global system freeze, and later analyze the state of the system at the time of the freeze.

Alternative Embodiments

It will be appreciated that, although specific embodiments of the invention have been described herein for purposes of illustration, various modifications may be made without departing from the spirit and scope of the invention. In particular, the process of freezing the state of the system is shown for a distributed computer system. However, it may be applied to other forms of interconnected computing systems that would benefit from a messaging technique that enables a command to be transmitted to all affected computing elements. Distributed systems are primarily client-server manifestations. Other forms of interconnected computing systems that may use this technique may include various peer-to-peer systems, including clustered systems. Accordingly, the scope of protection of this invention is limited only by the following claims and their equivalents.

We claim:

1. A method for servicing a computer system comprising:
   delivering a dedicated message to all nodes in said system affected by an event, wherein said nodes are members of a computer cluster with one or more nodes to coordinate access to a storage area network, and a cluster leader in said cluster to own one or more tasks for which members of said cluster require communication with said cluster leader to support a service; and
   capturing a state of at least two of said nodes responsive to receipt of said message, wherein the step of capturing a state of at least two of said nodes supports creation of a logical image of each of said nodes at a point in time, and prevents transition of said nodes to another state.

2. The method of claim 1, wherein said message is selected from a group consisting of: an out of band communication and an in-band communication.

3. The method of claim 1, further comprising broadcasting said capture of said state to all nodes in said cluster if said event is resident on at least one node in said cluster including capturing a state of all client and server nodes at a point-in-time in receipt of said message.

4. The method of claim 3, further comprising said cluster of nodes sending an external message to all clients in communication with at least one of said cluster nodes.

5. The method of claim 1, wherein said event is selected from a group consisting of:
an error embedded in a computer readable medium, an operator generated command, and occurrence of a pre-defined action, and combinations thereof.

6. The method of claim 1, further comprising analyzing a frozen state of captured nodes.

7. A computer system comprising:
a processor;
an application program executed by the processor, wherein the application program comprising:
a coordinator to deliver a dedicated message to all nodes in said system affected by occurrence of an event, wherein said nodes are members of a computer cluster with one or more nodes to coordinate access to a storage area network and a cluster leader in said cluster for at least one function in said system; and
a capture of a state on at least two of said nodes upon receipt of said message, wherein said capture of a state creates a logical image of said at least two nodes at a point in time and prevents transmission of a message from said at least two nodes.

8. The system of claim 7, wherein said message is selected from a group consisting of: an out-of band communication and an in-band communication.

9. The system of claim 7, further comprising an announcement of said event to all nodes in said cluster, wherein receipt of said announcement initiates a freeze command to capture a state of all nodes in said cluster at a point-in-time.

10. The system of claim 9, further comprising an external message adapted to be communicated to all clients in communication with at least one of said cluster nodes.

11. The system of claim 7, wherein said event is selected from a group consisting of:
an error embedded in a computer readable medium, an operator generated command, and occurrence of a pre-defined action, and combinations thereof.

12. The system of claim 7, further comprising a frozen state of a captured node adapted to be analyzed.

13. An article comprising:
a computer-readable storage medium;
means in the medium for delivering a dedicated message to all nodes affected by an event, wherein said nodes are members of a computer cluster with one or more nodes to coordinate access to a storage area network and a cluster leader in said cluster for at least one function in said system; and
means in the medium for initiating a capture of a state of at least two of said nodes upon receipt of said message, wherein said capture of a state is a logical image of said node, and wherein said capture of a state prevents transmission of a message from said node.

14. The article of claim 13, wherein said message is selected from a group consisting of: an out-of band communication and an in-band communication.

15. The article of claim 13, further comprising means in the medium for announcing said capture of said state to all cluster member nodes in said cluster if said event is resident on at least one node in said cluster.

16. The article of claim 15, further comprising means in the medium for communicating said message to all clients in communication with at least one of said cluster nodes.

17. The article of claim 13, wherein said event is selected from a group consisting of:
an error embedded in a computer readable medium, an operator generated command, and occurrence of a pre-defined action, and combinations thereof.

18. The article of claim 13, further comprising means in the medium for analyzing a frozen state of said captured node.

19. A method for servicing a computer system comprising:
delivering an out-of-band disk based message to all nodes in said system, and in communication with a storage area network, affected by an event, wherein said nodes are members of a computer cluster with one or more nodes to coordinate access to a storage area network;
using said message to freeze a state of at least two of said nodes upon receipt of said message; and
preventing transmission of a message from said node having a frozen state.

* * * * *